United States Patent [19]

Linder et al.

[11] Patent Number: 5,140,249
[45] Date of Patent: Aug. 18, 1992

[54] MOTOR-OPERATED GRASS CUTTER

[75] Inventors: Walter Linder, Etziken; Urs Ruepp, Solothurn, both of Fed. Rep. of Germany

[73] Assignee: Scintilla AG, Solothurn, Switzerland

[21] Appl. No.: 457,807

[22] PCT Filed: Apr. 12, 1989

[86] PCT No.: PCT/EP89/00392
§ 371 Date: Dec. 15, 1989
§ 102(e) Date: Dec. 15, 1989

[87] PCT Pub. No.: WO89/10682
PCT Pub. Date: Nov. 16, 1989

[30] Foreign Application Priority Data

May 7, 1988 [DE] Fed. Rep. of Germany ....... 3815651

[51] Int. Cl.$^5$ .............................................. H02J 7/00
[52] U.S. Cl. ..................... 320/2; 30/DIG. 1; 320/35; 320/36
[58] Field of Search .............. 320/2, 35, 36; 30/DIG. 1

[56] References Cited

U.S. PATENT DOCUMENTS

| 2,529,038 | 4/1949 | Medlar et al. | 320/36 |
| 2,597,735 | 5/1952 | Jepsom | 320/2 |
| 3,329,880 | 4/1964 | Boyles | 320/2 |
| 3,883,789 | 5/1975 | Achenbach et al. | 320/2 |
| 3,999,110 | 12/1976 | Ramstrom et al. | 320/2 |
| 4,560,915 | 12/1985 | Soultanian | 320/35 |
| 4,833,390 | 5/1989 | Kumada et al. | 320/2 |

Primary Examiner—Steven L. Stephan
Assistant Examiner—Thomas M. Dougherty
Attorney, Agent, or Firm—Michael J. Striker

[57] ABSTRACT

An electric motor-operated grass cutter includes a housing; an electric motor; a plurality of cutting blades projecting from the housing, at least one of which is driven by the electric motor so as to reciprocate, and a chargeable storage battery connectable electrically with the electric motor. The storage battery also has a plurality of electrical contact lugs for charging. So that it can be charged safely and rapidly without disassembly the grass cutter also includes a charging socket mounted on the housing and accessible from the outside. The charging socket can have a plurality of additional contact lugs to facilitate electrical connection of a plug of an external charging device with the storage battery. The chargeable storage battery is structured so as to be quick-chargeable and external devices for quick-charging and trickle charging can be provided. A temperature contact lug can be provided for transmitting measured values of temperature for monitoring the quick charging.

8 Claims, 2 Drawing Sheets

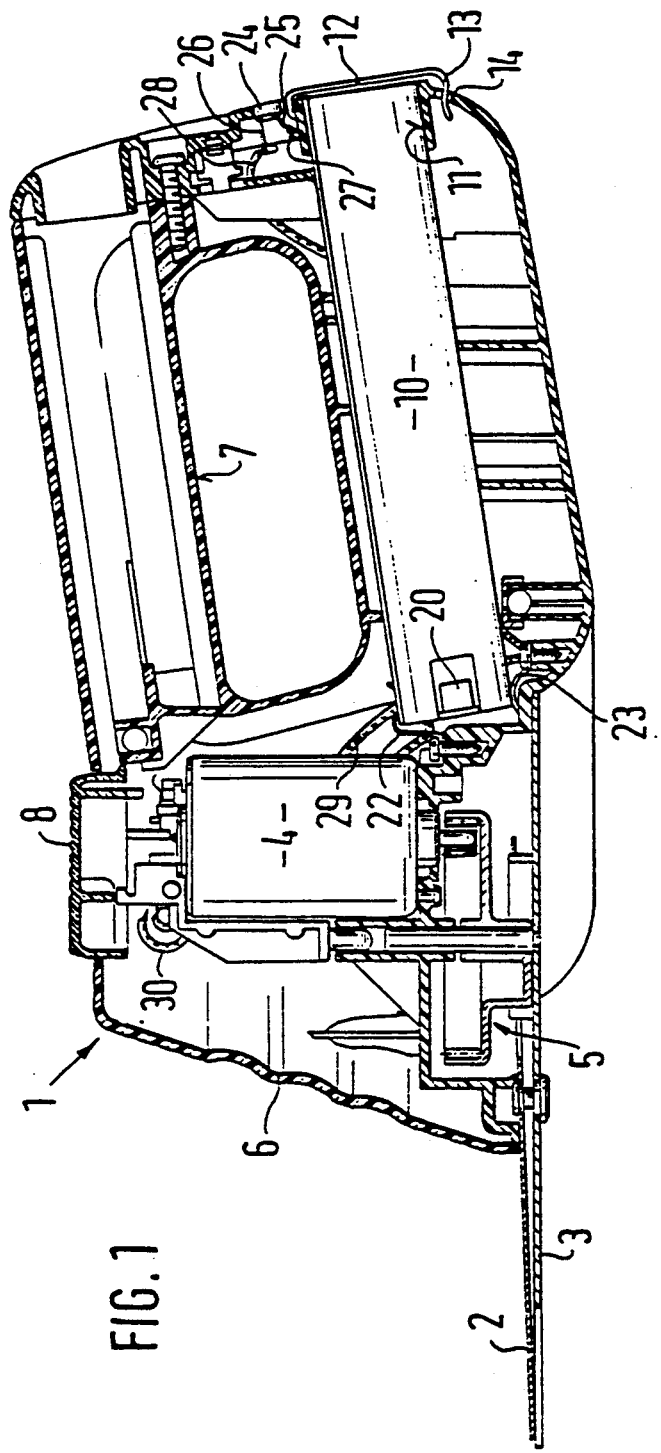
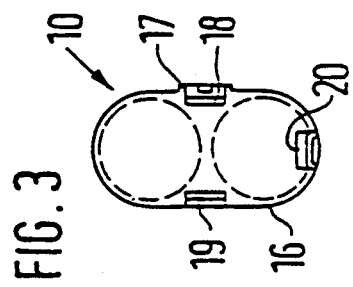
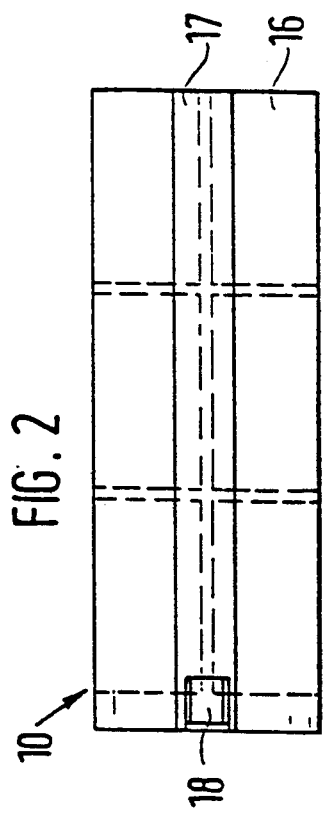

MOTOR-OPERATED GRASS CUTTER

BACKGROUND OF THE INVENTION

The present invention relates to an electric motor driven grass cutter and, more particularly, to a rechargeable electric motor driven grass cutter.

A rechargeable grass cutter is known comprising a housing, an electric motor, reciprocating cutting blades projecting from the housing and drivable by the electric motor, a chargeable storage battery and a socket for the charging the storage battery. The socket, which is electrically connected to the storage battery, is mounted on the housing and connects a charging device to the storage battery for slow normal charging operation. An electrically operated grass cutter which comprises chargeable batteries, which are fixedly installed, and a socket and is connectable with an alternating current source is already known from U.S. Pat. Ser. No. 36-23-223. The long charging time required with conventional charging devices is annoying for the user if only a short piece of lawn or the like is to be cut after the storage battery is empty. He can then only complete his gardening work after a long charging time, e.g. on the next day.

SUMMARY OF THE INVENTION

It is an object of the present invention to provide an electric motor-operated grass cutter of the above-described typed, in which the chargeable storage battery driving the electric motor can be charged more quickly than the current electric motor-operated grass cutter as well as at a slow normal charge rate.

These objects and others which will be made more apparent hereinafter are attained in an electric motor-operated grass cutter comprising a housing; an electric motor; a plurality of cutting blades projecting from the housing, at least one of which is driven by the electric motor so as to reciprocate, and a chargeable storage battery connectable electrically with the electric motor and having a plurality of electrical contact lugs.

According to the invention, the grass cutter also comprises a charging socket accessible from outside of the housing. The storage battery is electrically connectable via the charging socket for trickle charging and, alternatively, for quick charging. The chargeable storage battery is structured to be quick-chargeable. The temperature contact lug is connected to the chargeable storage battery for transmitting measured values of temperature for monitoring the quick charging.

In a preferred embodiment additional contact lugs connected to the battery can be provided in the charging socket for easy connection of the battery with the charging device.

In contrast, the grass cutter, according to the invention has the advantage that its operational possibilities are expanded and its availability with respect to time is increased. The storage battery of the grass cutter can be charged quickly as needed in a brief period of time, so that the cutter is already fully ready for use again after an hour. In order to protect the storage battery, a third contact for monitoring the temperature is provided in addition to the positive and negative contacts. In normal use, when the capacity of the storage battery is sufficient for the lawn work, the storage battery is charged slowly in a careful manner with an inexpensive trickle charging device.

Advantageous developments and improvements of the grass cutter are made possible by means of the steps indicated in the subclaims. It is particularly advantageous that the storage battery be easy to remove from the grass cutter. Moreover, the removability facilitates the separate disposal of a used storage battery in a manner not harmful to the environment. When the contact for the temperature monitoring is connected to a charging socket in the housing, the desired charging device need only be plugged in in order to charge the storage battery either quickly or slowly.

BRIEF DESCRIPTION OF THE DRAWING

The objects, features and advantages of the present invention will now be illustrated in detail in the following detailed description, reference being made to the accompanying drawing in which:

FIG. 1 is a longitudinal cross sectional view of an electric motor-operated grass cutter according to our invention, FIG. 2 is a top plan view of a storage battery of the grass cutter of FIG. 1, and FIG. 3 is a front elevational view of the storage battery of FIG. 2.

DETAILED DESCRIPTION OF THE INVENTION

Figure 4:
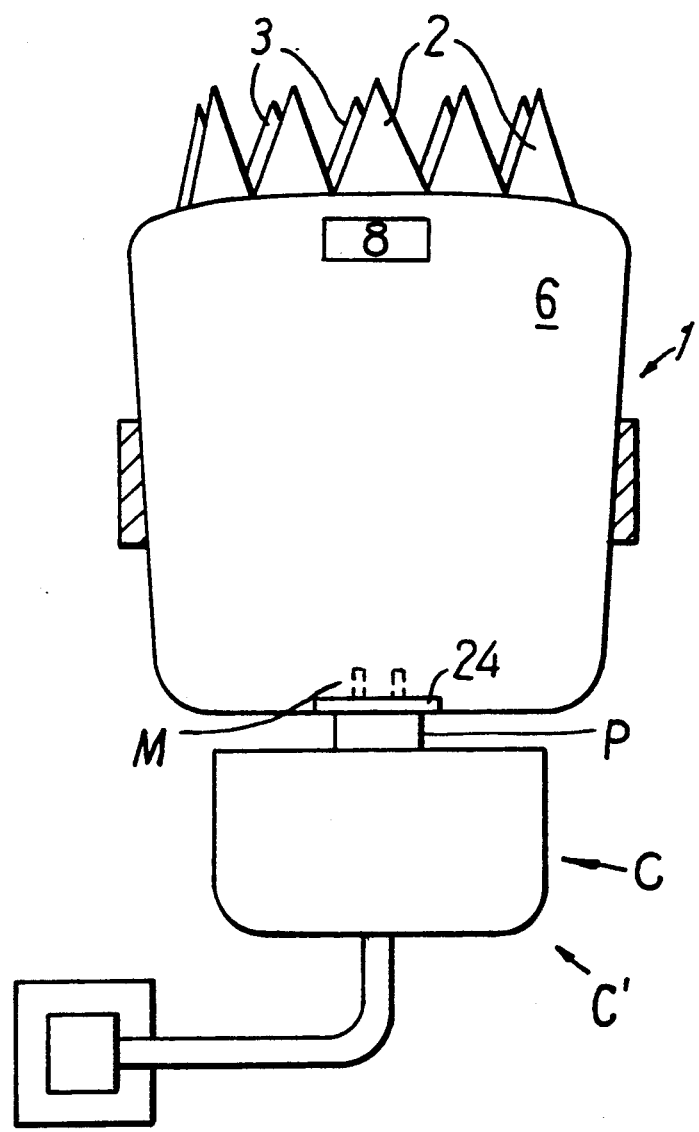
FIG. 4 is a view of the device connected to the charger.

The grass cutter 1 has two cutting blades 2, 3 which are located one above the other and are driven in a reciprocating manner relative to one another by an electric motor 4 with gearing 5. Moreover, a switch 8 and a chargeable storage battery 10 are accommodated inside the housing 6 of the grass cutter, which has a handle opening 7.

The storage battery 10 can be inserted into a housing opening 11 which is closable with a cover 12. The cover 12 comprises a flexible tongue 13 which forms a snap lock together with a housing projection 14.

The storage battery 10 comprises six single cells, three of which are arranged one after the other and two being arranged adjacent to one another in a case 16 (see FIG. 2). A rib 17 extends longitudinally on a broad side of the case 16. Three electrical contacts are arranged at one end of the storage battery 10: a negative contact clip 18 in the vicinity of the rib 17, a positive contact lug 19 located opposite the negative contact lug 18, and an additional temperature contact lug 20 for the temperature monitoring at one of the narrow sides of the case 16 (see also FIG. 3). A resistor, not shown, which is independent of temperature, e.g. an NTC resistor, which is arranged close to one of the storage battery cells and takes on the temperature of the latter is located between the positive contact 19 and the temperature contact 20.

The grass cutter 1 has two contact springs 22, 23 in its interior which contact the contact clips 18 and 19 of the storage battery 10 when the latter is inserted. A contact spring can also be provided for the temperature contact lug 20.

The grass cutter 1 has a charging socket 24 at the rear portion or part (the right side of FIG. 1) of the housing 6 for a commercially available two-pole jack connector with two contact lugs 25, 26. One contact of the charging socket is connected via a current conductor 27 with the contact spring 23 and the other is connected with the contact spring 22 via a current conductor 28. The contact springs 22 and 23 are connected in turn with the switch 8 and with the motor 4, respectively, again via current conductors 29, 30. When the switch 8 is closed, the current is conducted from the latter to the motor 4.

For slow charging, which requires approximately twelve hours when the storage battery 10 is empty, the grass cutter 1 is either inserted in a wall holder shown in FIG. 4 which is equipped with charging device C and jack connector, or the jack connector P of a charging device is plugged directly into the socket 24. Because of the low charging current of approximately 120 mA, the grass cutter 1 can remain connected to the charging device for as long as is desired. This is what is meant in the following by normal slow charging.

For quick charging, the storage battery 10 is either removed from the device and inserted into a quick charging device C' shown in FIG. 4 or the quick charging device is connected to the grass cutter via a plug-in connection, so that, in addition to the charging contacts, the temperature contact 20 of the storage battery 10 also has a connection M to the charging device. An discharged storage battery 10 can thus be completely charged again in approximately 1 hour. The quick charging device C' comprises a circuit which measures the temperature-independent resistance of the NTC resistor and switches on the high quick charging current only at temperatures between 0° C. and 45° C., so that the storage battery cells can not sustain any damage. When exceeding or falling below the allowable temperature or when the storage battery is completely charged, the quick charging device switches to a low trickle charging current in order to prevent a self-discharge of the storage battery.

The trickle charging device or the quick charging device can also be built into the housing of the grass cutter 1 directly, so that only a connecting power cable need be plugged in for the charging of the storage battery.

It will be understood that each of the elements described above, or two or more together, may also find a useful application in other types of structures differing from the types described above.

While the invention has been illustrated and embodied in a motor-operated grass cutter, it is not intended to be limited to the details shown, since various modifications and structural changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In an electric motor-operated grass cutter comprising a housing (6); and electric motor (4); a plurality of cutting blades (2, 3) projecting from said housing (6), at least one of which is driven by said electric motor (4) so as to reciprocate, and a chargeable storage battery (10) connectable electrically with said electric motor (4) and having a plurality of electrical contact lugs (18, 19), said contact lugs (18, 19) being electrically connectable for charging of the chargeable storage battery, the improvement comprising a charging socket (24) accessible from outside of the housing, said chargeable storage battery being electrically connectable via the charging socket (24) for trickle charging and, alternatively, for quick charging, the chargeable storage battery (10) being structured to be quick-chargeable, and a temperature contact lug (20) connected to said chargeable storage battery for transmitting measured values for monitoring the quick charging.

2. The improvement as defined in claim 1, in which the temperature contact lug (20) is arranged on the housing (6).

3. The improvement as defined in claim 1, wherein the charging socket (24) is attached to a rear part of the housing (6), and further comprising a wall mounted-charging device (c) having a plug (P), the plug being insertable into and connectable electrically to the charging socket (24).

4. The improvement as defined in claim 4, further comprising a case (16) which receives and holds said chargeable storage battery (10) and wherein said temperature contact lug (20) is located on said case (16).

5. The improvement as defined in claim 4, wherein said housing (6) is provided with a housing opening (11) in which said case (16) containing said storage battery (10) is held, and further comprising a cover (12) for said housing opening.

6. The improvement as defined in claim 1, further comprising a switch (8) connected electrically with said electric motor (4) and a plurality of contact springs (22), said contact springs (22) being connected electrically with said charging socket (24) and also with said switch (8), said contact springs contacting said contact lugs (18, 19) of said chargeable storage battery (10) when said chargeable storage battery (10) is inserted in said housing (5).

7. The improvement as defined in claim 1, further comprising a charging device (C) for trickle charging.

8. The improvement as defined in claim 1, further comprising a quick charging device (C') for charging the rechargeable storage battery and a plurality of additional contact lugs (25, 26) associated with the charging socket (24), said additional contact lugs (25, 26) being electrically connectable with said rechargeable storage battery and said quick charging device being electrically connectable to said additional contact lugs (25, 26) and said additional temperature contact lug (20).

* * * * *